United States Patent [19]

Takiyasu et al.

[11] Patent Number: 4,792,947
[45] Date of Patent: Dec. 20, 1988

[54] METHOD OF MULTI-ADDRESS COMMUNICATION

[75] Inventors: Yoshihiro Takiyasu, Higashimurayama; Kenichi Wada, Sagamihara, both of Japan

[73] Assignee: Hitachi, Ltd., Tokyo, Japan

[21] Appl. No.: 37,848

[22] Filed: Apr. 13, 1987

[30] Foreign Application Priority Data

Apr. 11, 1986 [JP] Japan .................................. 61-82231

[51] Int. Cl.⁴ .............................................. H04J 3/00
[52] U.S. Cl. .......................................... 370/86; 370/16
[58] Field of Search ....................... 370/85, 86, 89, 95, 370/88, 16, 13

[56] References Cited

U.S. PATENT DOCUMENTS

| | | | |
|---|---|---|---|
| 4,507,777 | 3/1985 | Tucker et al. | 370/16 |
| 4,530,085 | 7/1985 | Hamada et al. | 370/16 |
| 4,553,233 | 11/1985 | Debuysscher et al. | 370/16 |
| 4,593,154 | 6/1986 | Takeda et al. | 370/16 |

Primary Examiner—Douglas W. Olms
Assistant Examiner—Wellington Chin
Attorney, Agent, or Firm—Antonelli, Terry & Wands

[57] ABSTRACT

A method of multi-address communication in a loop network formed by connecting a plurality of nodes each provided with a data processor to one another through a transmission line in which, in order for a transmitting node having transmitted a multicast information frame to be able to confirm the delivery of the multicast information frame, the transmitting node transmits a multicast response frame for the delivery of confirmation of the multicast information frame, immediately after the transmission of the multicast information frame, and receiving nodes present information for indicating the reception of the multicast information frame at the address part of the multicast response frame, in the order of node arrangement in the loop network in the direction from the transmitting node toward the downstream thereof, to check the information by each of the receiving nodes and the transmitting node.

5 Claims, 7 Drawing Sheets

12 --- DELIMITER
13 --- DESTINATION ADDRESS FIELD
14 --- SOURCE ADDRESS FIELD
15 --- FRAME COMMAND
16 --- INFORMATION FIELD
17 --- FRAME CHECK SEQUENCE
18 --- DELIMITER

```
LC ─┬─ INFORMATION FRAME
    ├─ TOKEN FRAME
    ├─ ACCEPT FRAME
    └─ BUSY FRAME
```

12 --- DELIMITER
13 --- DESTINATION ADDRESS FIELD
14 --- SOURCE ADDRESS FIELD
15 --- FRAME COMMAND
16 --- INFORMATION FIELD
17 --- FRAME CHECK SEQUENCE
18 --- DELIMITER

METHOD OF MULTI-ADDRESS COMMUNICATION

BACKGROUND OF THE INVENTION

The present invention relates to a method of multi-address communication in a loop network which is formed by connecting a plurality of nodes (namely, communication control devices) each provided with a data processor, to one another through a transmission line, and more particularly to a method of multi-address communication capable of confirming the delivery of multicast information.

In a communication system where a plurality of data processors are connected to a bus through communication control devices (hereinafter referred to as "nodes"), to communicate with one another, two communication methods can be used. One of the methods is individual communication in which information is sent from a transmitting node to a specified receiving node, and the other method is multi-address communication in which the same information as transmitted from a transmitting node is received by all the nodes.

In the individual communication, each node is so constructed as to respond to the transmitted information when the node is specified as the receiving node, and the response can be made in two methods. In one of the methods, an information frame includes a response bit, and the receiving node sets the response bit to a state capable of indicating that the receiving node has succeeded in accepting the information frame. In the other method, the receiving node sends a response frame to the transmitting node when the receiving node receives an information frame transmitted from the transmitting node. The latter method is superior in the reliability of communication information than the former method.

The latter method is discussed in material paper No. 23 (1984), Working groups for Distributed Processing System in Information Processing Society of Japan, pp. 1–8.

Figure 6:
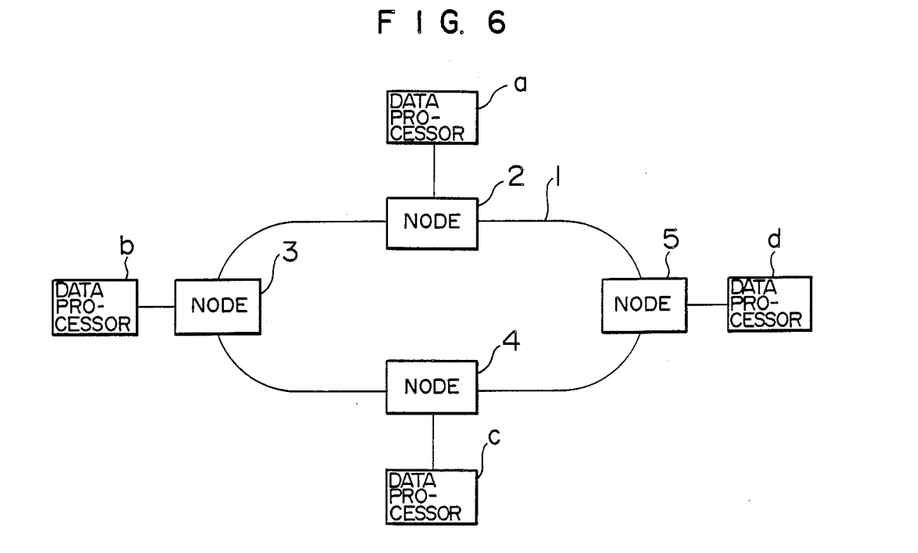
FIG. 6 is a block diagram showing a conventional loop transmission system.
Figure 7:
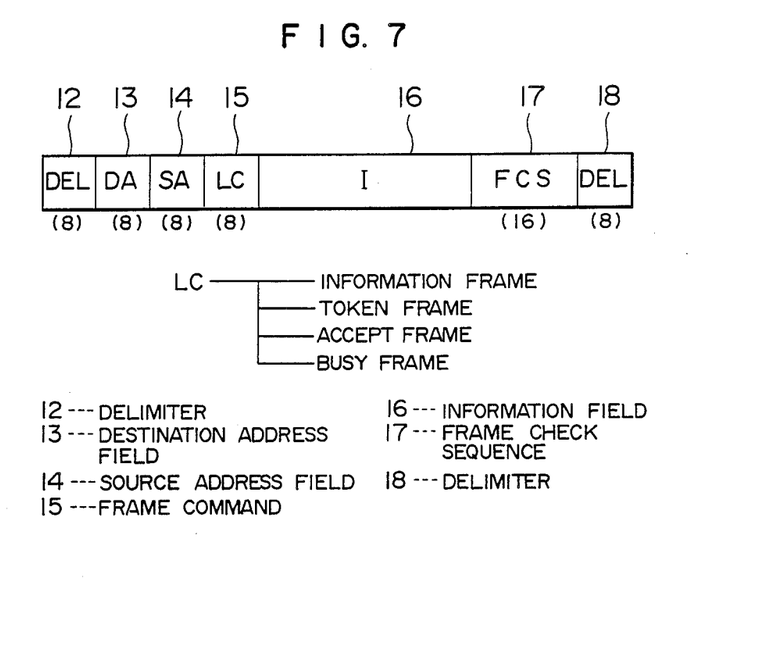
FIG. 7 is a schematic diagram showing a conventional frame format.

FIG. 6 shows the construction of a conventional loop transmission system. In FIG. 6, reference characters a, b, c and d designate data processors, and reference numerals 2, 3, 4 and 5 designate nodes. As shown in FIG. 6, the nodes 2 to 5 are connected to one another through a transmission line 1, to form a loop network. In this network, a token passing access method is usually employed. FIG. 7 shows a conventional frame format. Referring to FIG. 7, a frame is bounded by delimiters 12 and 18, and includes a destination address field 13, a source address field 14, a frame command (or loop command) 15 for indicating the kind of the frame, an information field 16, and a frame check sequence field 17. Other frames than an information frame, that is, a token frame, a response frame and others do not include the information field 16. The response frame is classified into an accept (ACP) frame for indicating the success in accepting an information frame and a busy (BSY) frame for indicating the failure in accepting the information frame due to the busy state of a buffer which is to store the information frame.

Figure 8:
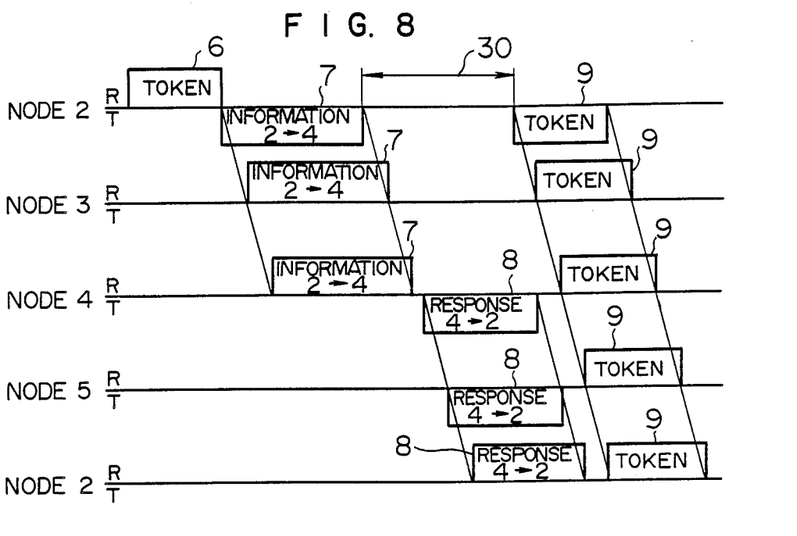
FIGS. 8 and 9 are timing charts for explaining the conventional individual communication and the conventional multi-address communication.
Figure 9:
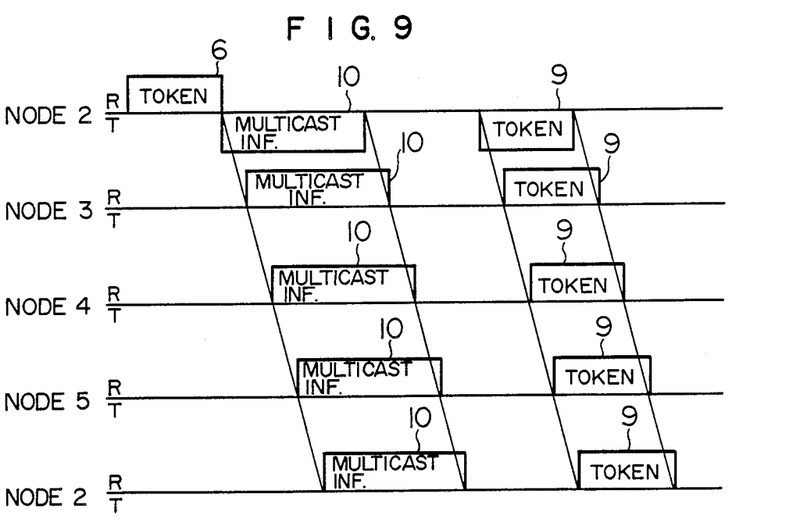

FIG. 8 shows a response operation in individual communication which is performed when a receiving node receives an information frame. Referring to FIG. 8, when an information frame 7 transmitted from a node 2 which has acquired the transmitting right, is received by a node 4 whose address is recorded in the destination address field of the information frame 7, the node 4 transmits the ACP or BSY frame to the transmitting node 2. When a response period 30 set for response frame has elapsed, the transmitting node 2 transmits a token frame 9 to abandon the transmitting right. In the conventionl communication method, the response period is predetermined, and hence it is impossible that, in multi-address communication, all the nodes transmit response frames. Accordingly, in the conventional multi-address communication using the token ring system, as shown in FIG. 9, each node having received a multicast information frame 10 does not transmit any response frame. The above-mentioned material does not deal with the response method in multi-address communication.

As mentioned above, in a case where a node fails in accepting multicast information because of the busy state of a buffer for the multicast information, the conventional communication method cannot inform a transmitting node of the above failure.

SUMMARY OF THE INVENTION

It is a main object of the present invention to provide a method of multi-address communication capable of solving the above problem of the prior art and carrying out delivery of a confirmation that a transmitting node is informed of the success or failure in accepting information at a receiving node, in multi-address communication as in individual communication. In order to attain the above object, according to one aspect of the present invention, a transmitting node having transmitted a multicast information frame transmits a multicast response frame for the delivery confirmation of the multicast information frame immediately after the transmission of the multicast information frame, and receiving nodes having received the multicast information frame presents information for indicating the reception of the multicast information frame, at the address portion of the multicast response frame, in the order of the node arrangement in a loop network in the direction from the transmitting node toward the down stream thereof, to check the information by the transmitting node and each of the receiving nodes.

The information for indicating the reception of the multicast information frame may be presented at the source address field or destination address field of the multicast response frame. In a case where the above information is presented at the source address field, a node having succeeded in accepting the multicast information frame records its own address in the source address field. Accordingly, when each node is informed of the address of the adjacent, upstream node thereof, each node can judge from the multicast response frame whether or not the adjacent, upstream node has succeeded in accepting the multicast information frame. When a node detects a failure in accepting the multicast information frame by the multicast information frame, the node changes the contents of the loop command of the multicast response frame from "ACP" to "BSY", to inform the transmitting node having transmitted the multicast information frame of the failure in multi-address communication. In a case where information for indicating the reception of the multicast information frame is presented at the destination address field of the multicast response frame, a node having succeeded in accepting the multicast information frame records the address of the adjacent, downstream node in the destination address field. Thus, when the multi-address communication results in success, the destination address field of the multicast response frame received by the transmitting node contains the address of the transmitting node. When a node fails in accepting the multicast information frame, each of downstream nodes of the above node relays the multicast response frame to the next node while maintaining the address of the node having failed in accepting the multicast information frame, in the destination address field of the multicast response frame, to send such a response frame to the transmitting node, thereby informing the transmitting node of the failure in multi-address communication.

Further, according to another aspect of the present invention, a transmitting node having transmitted a multicast information frame sets a response period for transmission of a multicast response frame, immediately after the transmission of the multicast information frame, and a receiving node having failed in accepting the multicast information frame transmits a multicast response frame indicative of the failure in accepting the multicast information frame, in the response period. When the transmitting node receives the above multicast response frame, the multicast response frame informs the transmitting node of the failure in multi-address communication, and the transmitting node repeats the transmission of the multicast information frame a plurality of times, to succeed in the multi-address communication. In more detail, the transmitting node sets the response period just after the transmission of the multicast information frame. Meanwhile, the receiving node having failed in accepting the multicast information frame transmits the multicast response frame indicative of the failure in accepting the multicast information frame, in the response period, and the address of the above receiving node and the address of the transmitting node are recorded in the source address field and destination address field of the multicatt response frame, respectively. Thus, each of downstream nodes of the above receiving node can relay the multicast response frame to the next node. When the transmitting node receives the multicast response frame addressed thereto, the failure in multi-address communication is detected by the transmitting node, and the transmitting node retransmits the multicast information frame. When a node having succeeded in accepting the multicast information frame receives the retransmitted information frame, the node detects the duplicate transmission of multicast information frame, and neglects the retransmitted information frame to prevent a malfunction in a loop network.

The above and the other objects and features of the present invention will become more apparent from the following description taken in conjunction with the accompanying drawings.

DESCRIPTION OF THE PREFERRED EMBODIMENT

Figure 1:
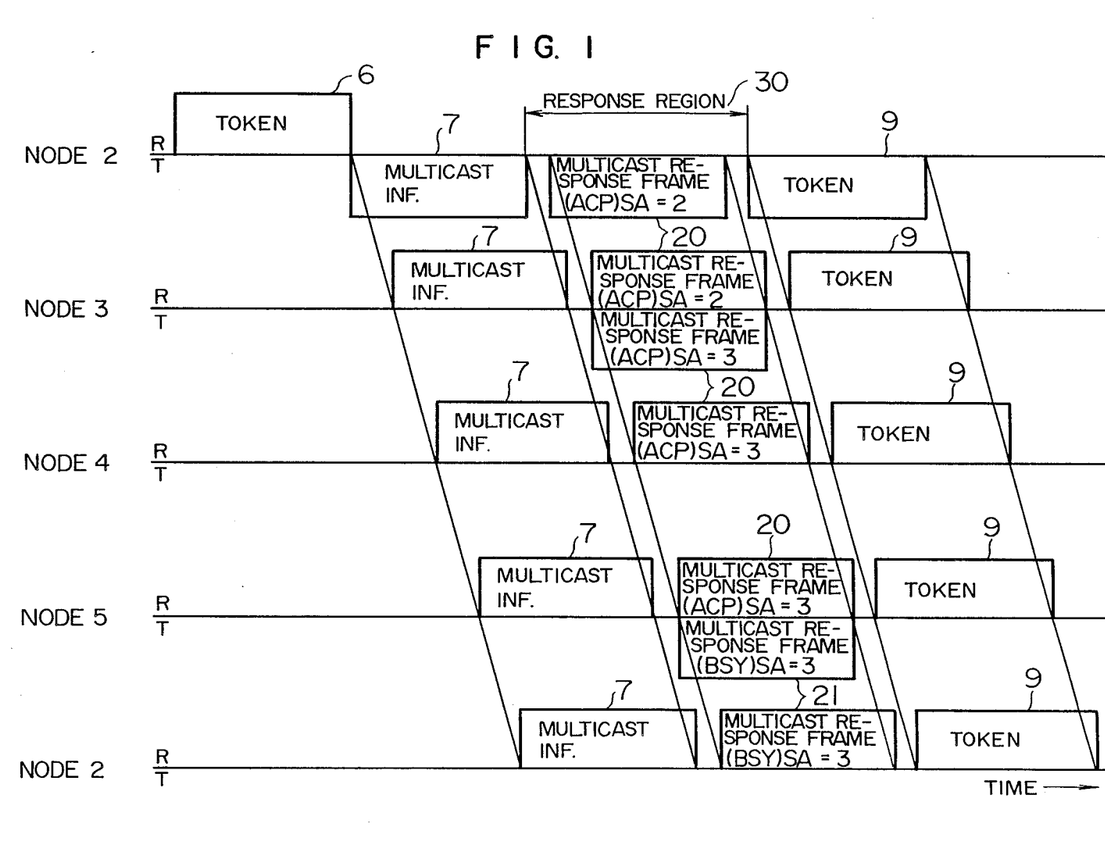
FIGS. 1, 2 and 4 are timing charts for explaining three embodiments of a method of multi-address communication according to the present invention.
Figure 2:
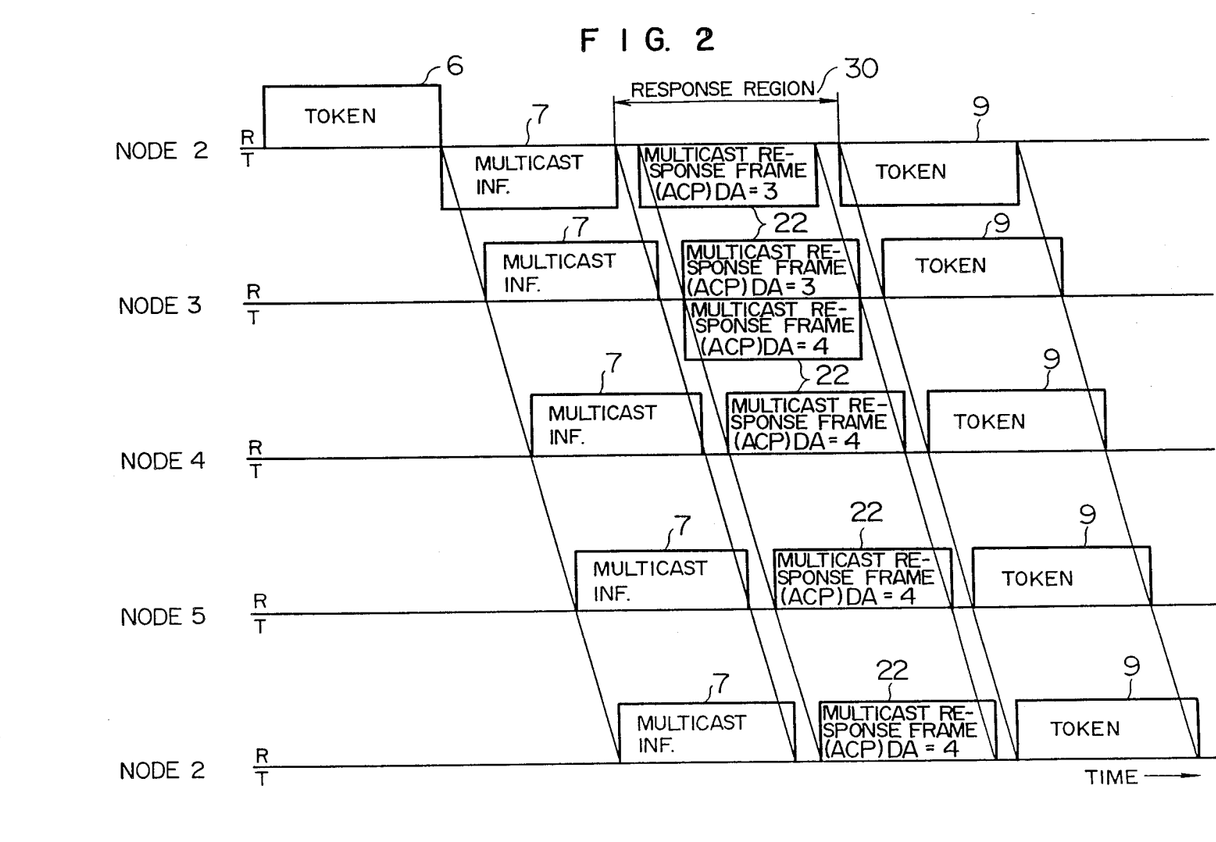

FIGS. 1 and 2 are timing charts for explaining two embodiments of a method of multi-address communication according to the present invention. In these embodiments, a transmitting node transmits a multicast information node repeatedly till multi-address communication results in success. Further, these embodiments are carried out in the loop network of FIG. 6 using the token passing access method, and frames used in the network have the same format as shown in FIG. 7.

In the embodiment of FIG. 1, nodes having received a multicast information frame present information for indicating the reception of the multicast information frame, at the source address field of a multicast response frame, in the order of node arrangement in the loop network. Meanwhile, in the embodiment of FIG. 2, the information for indicating the reception of the multicast information frame is presented at the destination address field of the multicast response frame.

Referring now to FIG. 1, when a node 2 which is requested to transmit a multicast information frame 7, receives a token frame 6, the node 2 acquires the transmitting right, and transmits the multicast information frame 7. Further, the node 2 sets a response period 30 corresponding to 16 octets, to transmit a multicast response frame 20 in the period 30. The destination address field, source address field and loop command of the multicast response frame 20 contain a multi-address, the address of the transmitting node 2 and an accept (ACP) pattern, respectively. After having transmitted the multicast response frame 20, the node 2 transmits another token frame 9, to abandon the transmitting right.

Now, explanation will be made of a case where a node 3 succeeds in accepting the multicast information frame 7 transmitted from the node 2, and a node 4 fails in accepting the multicast information frame 7 owing to an error or fault in hardware at the node 4.

The node 3 having succeeded in accepting the multicast information frame 7, checks the multicast response frame 20 which follows the multicast information frame 7. The node 3 confirms that the address of the adjacent, upstream node 2 is recorded in the source address field of the multicast response frame 7, and then changes the address recorded in the source address field to the address of the node 3.

The node 4 having failed in accepting the multicast information frame 7 relays the multicast response frame 20 which follows the multicast information frame 7, to the adjacent, downstream node 5.

The node 5 having succeeded in accepting the multicast information frame 7 finds that the address recorded in the source address field of the multicast response frame 20 is different from the address of the adjacent, upstream node 4, and thus is informed of the failure in accepting the multicast information node 7 at the node 4. Hence, the node 5 changes the ACP pattern recorded in the loop command of the multicast response frame 20 to the BSY (busy) pattern, to transmit a modified response frame 21.

When the node 2 having transmitted the multicast information frame 7 receives the modified response frame 21, the node 2 is informed that multi-address communication has failed at the adjacent, downstream node of the node 3, and carries out predetermined processing.

The embodiment of FIG. 2 is different from the embodiment of FIG. 1 in two points, that is, the address information recorded in a multicast response frame which is transmitted from the node 2 immediately after the transmission of the multicast information frame 7, and the processing of the multicast response frame at each receiving node. Accordingly, only the above points will be explained below.

Referring to FIG. 2, the node 2 transmits a multicast response frame 22, immediately after having transmitted the multicast information frame 7. The destination address field, source address field and loop command of the multicast response frame 22 transmitted from the node 2 contain the address of the adjacent, downstream node 3, the address of the node 2 and the ACP pattern, respectively. After having received the multicast information frame 7, the node 3 receives the multicast response frame 22, and changes the address recorded in the destination address field of the frame 22 to the address of the adjacent, downstream node 4. The node 4 having failed in accepting the multicast information frame 7 relays the multicast response frame 22 to the adjacent, downstream node, that is, the node 5. The node 5 finds that the address recorded in the destination address field of the frame 2 is different from the address of the node 5, and hence relays the multicast response frame 22 to the adjacent, downstream node, that is, the node 2. The node 2, that is, the transmitting node finds that the address recorded in the destination address field of the frame 22 is not the address of the node 2 but the address of the node 4, and is informed that the multi-address communication has failed at the node 4. Accordingly, the node 2 can carry out predetermined processing.

Figure 3:
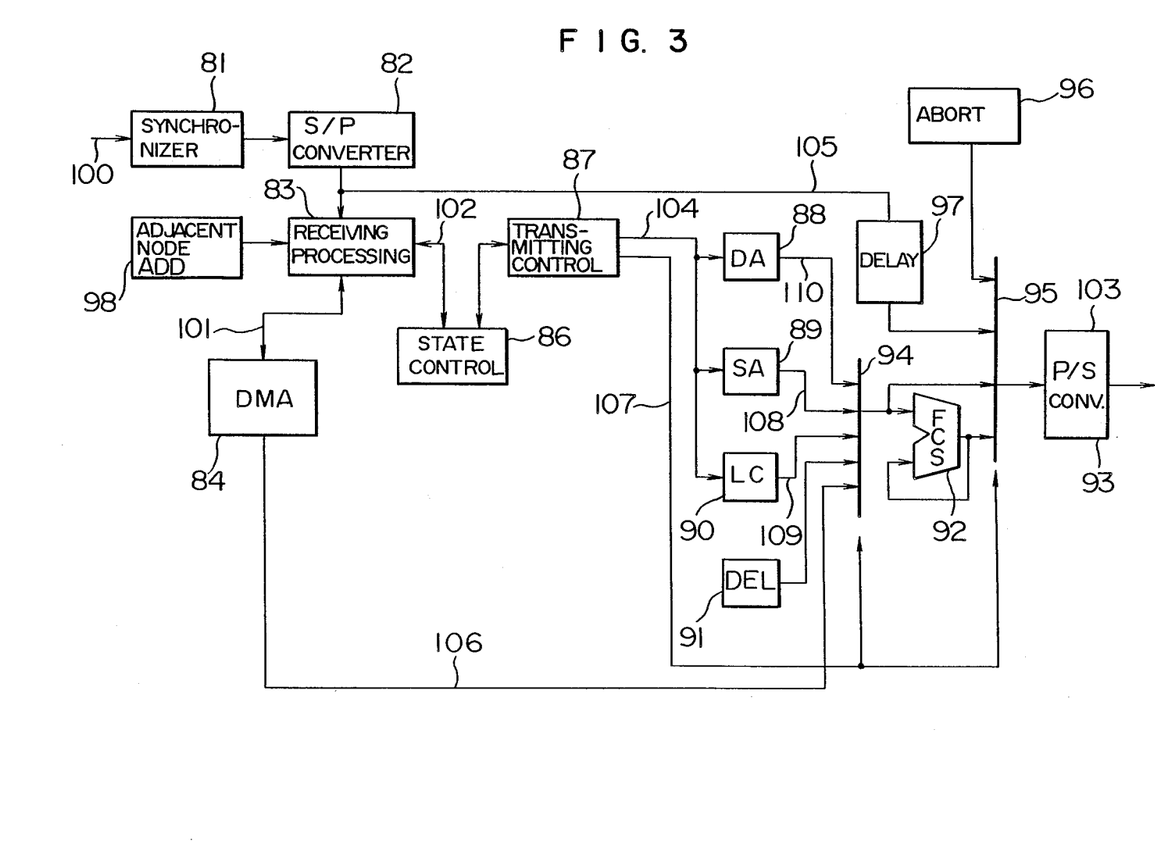
FIG. 3 is a block diagram showing a frame transmission/reception control unit which is provided in each node to carry out the embodiments of FIGS. 1 and 2.

FIG. 3 shows a frame transmission/reception control unit which is provided in each node to carry out the embodiments of FIGS. 1 and 2. The above control unit operates as follows. Referring to FIG. 3, received data 100 is applied to a synchronizer 81, to be subjected to synchronizing processing, and then converted by a serialparallel converter 82 into a 8-bit parallel signal 105, since a fundamental unit made up of eight bits is employed in each field of FIG. 7. In a case where the received data 100 is self-addressed or multi-addressed, only the information field of the data is sent to a buffer in a DMA 84 through a received-data processor 83, to be stored in the buffer. Further, when a received frame is self-addressed, the frame is aborted on the basis of a signal from an abortion indicating part 96. When the data 100 is addressed to another node or multi-addressed, the parallel signal 105 is selected by a second field selector 95, to be relayed to the next node.

A delay circuit 97 is provided to carry out synchronizing processing necessary for modifying the contents of a desired field. In a case where the embodiment of FIG. 1 is carried out, the address of an adjacent, upstream node is set in an adjacent node address part 98. Meanwhile, in a case where the embodiment of FIG. 2 is carried out, the address of an adjacent, downstream node is set in the adjacent node address part 98. When a multicast information frame is transmitted from the control unit, a multicast information transmitting flag is recorded in a state controller 86.

In the embodiment of FIG. 1, the delay circuit 97 of a node having received a multicast response frame has to delay the parallel signal 105 by two bytes, to modify the contents of the source address field or loop command of the multicast response frame. Meanwhile, in the embodiment of FIG. 2, it is required to delay the parallel signal 105 by three bytes. That is, the embodiment of FIG. 1 is smaller in amount of signal delay than the embodiment of FIG. 2, and thus the former embodiment is more advantageous than the latter embodiment. However, in the loop network using the token passing access method, each node contains the address of the adjacent, downstream node. Accordingly, in a case where the embodiment of FIG. 2 is carried out, each node can perform a desired operation by adding only a small number of parts to conventional control unit. The embodiment of FIG. 2 also has the following advantage. That is, each node is not required to check the loop command of the multicast response frame, but relays the multicast response frame addressed to a different node, to the next node.

Figure 4:
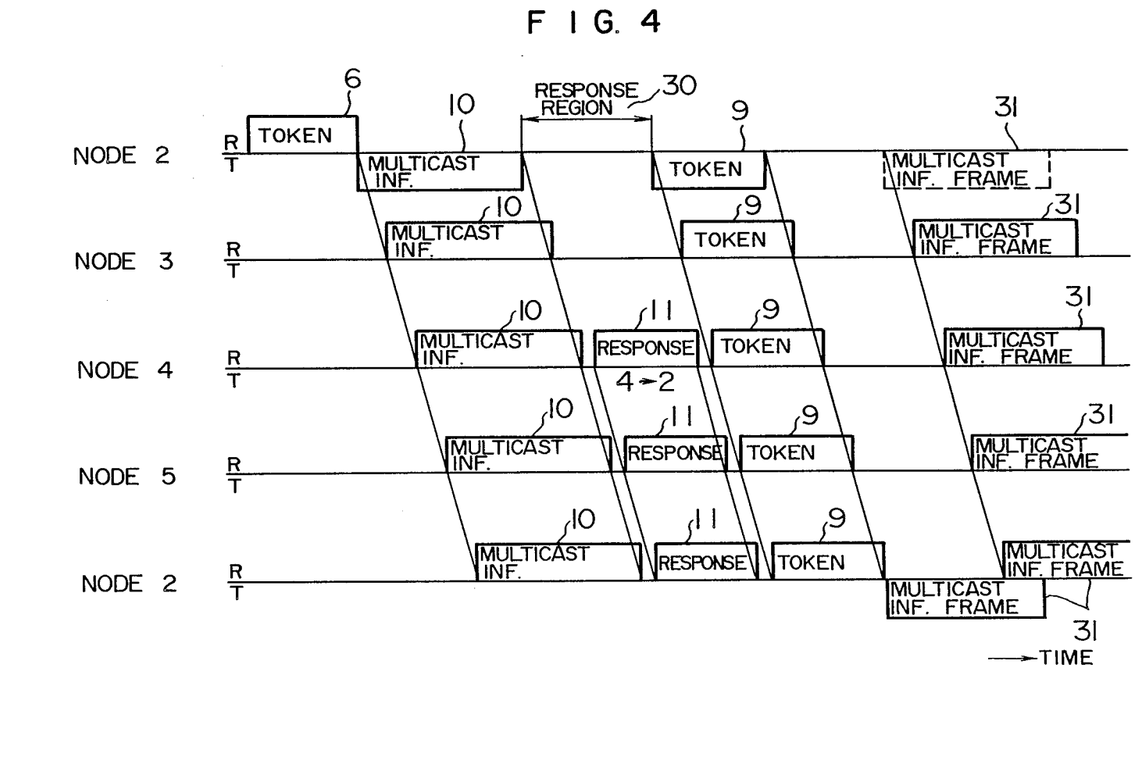
Figure 5:
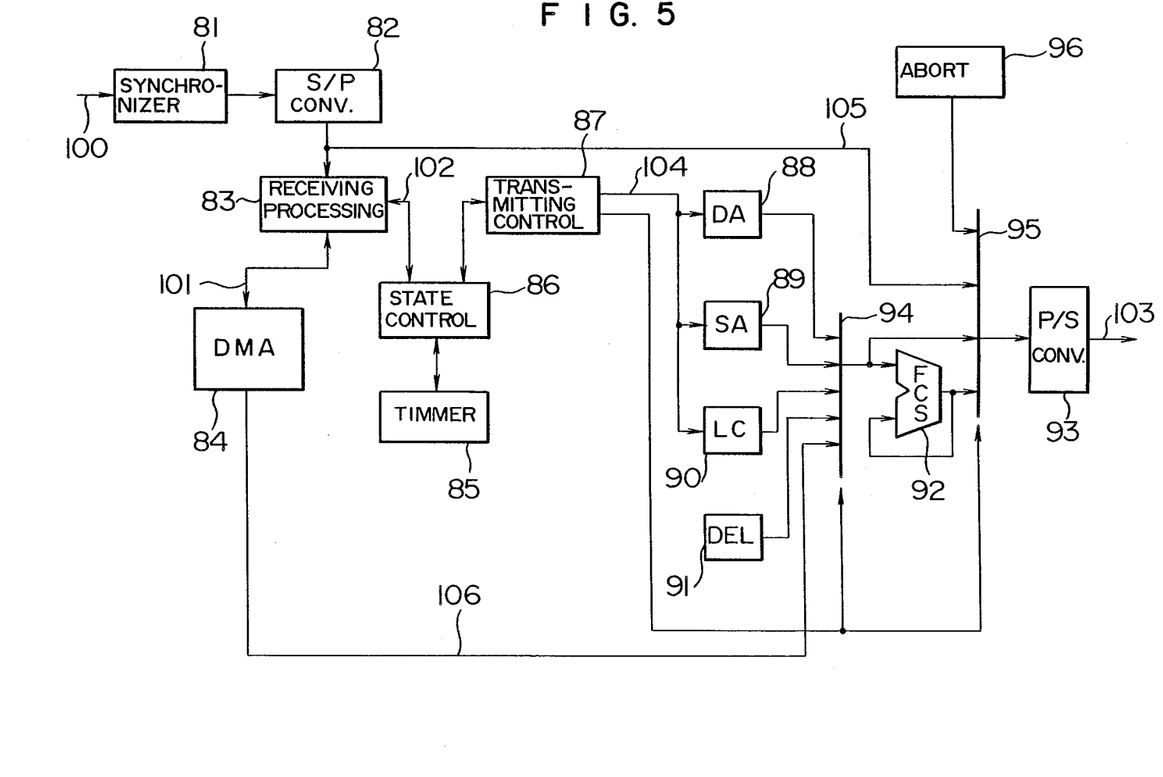
FIG. 5 is a block diagram showing a frame transmission/reception control unit which is provided in each node to carry out the embodiment of FIG. 4.

FIG. 4 is a timing chart for explaining a further embodiment of a method of multi-address communication according to the present invention, and FIG. 5 is a block diagram showing a frame transmission/reception control unit which is provided in each node to carry out the above embodiment.

Referring to FIG. 4, when the node 2 requested to transmit a multicast information frame 10 receives the token frame 6 to aquire the transmitting right, the node 2 transmits the frame 10, and sets the response period 30 corresponding to 16 octets, in order to be able to transmit a response frame in this period. Then, the node 2 transmits the token frame 9, to abandon the transmitting right. Now, explanation will be made of a case where the node 3 succeeds in accepting the multicast information frame 10, and the node 4 fails in accepting the frame 10 owing to the busy state of the buffer for the multicast information frame 10.

The node 3 having succeeded in accepting the multicast information frame 10 does not perform any other operation than the relay of the frame 10. The node 4 having failed in accepting the multicast information frame 10 relays the frame 10 to the adjacent, downstream node, and also transmits a multicast response frame 11 in the response period 30 which follows the relaying period of the frame 10, to inform the node 2 of the failure in multi-address communication. The destination address field, source address field and loop command of the multicast response frame 11 contain the address of the node 2, the address of the node 4 and the BSY pattern, respectively. The node 5 relays the multicast response frame 11 to the node 2.

The node 2 having received the multicast response frame 11 is informed of the failure in the multi-address communication, and acquires the transmitting right by receiving the token frame 9. Thus, the node 2 sends out a retransmitted version 31 of the multicast information frame 10. The node 3 having received the retransmitted information frame 31 detects the duplicate transmission of information frame, and neglects the retransmitted information frame 31. However, the node 4 accepts the retransmitted information frame 31, when the buffer is kept at the free state. When the buffer of the node 4 is kept at the busy state, the transmission of the multicast response frame 11 and the following operations are repeated, a plurality of times. In the present embodiment, a time necessary for the multicast information frame transmitted from a node to return to the node, is monitored, and the same retransmitting operation as mentioned above is performed when the multicast information frame fails to return to the transmitting node within a predetermined period.

Next, explanation will be made of the operation of the control unit of FIG. 5 for carrying out the embodiment of FIG. 4.

Received data 100 is applied to the synchronizer 81, to be subjected to synchronizing processing, and then converted by the serial-parallel converter 82 into the 8-bit parallel signal 105. In a case where the data 100 is self-addressed or multi-addressed data, only the information field of the received data is sent to a buffer in the DMA 84 through the received-data processor 83, to be stored in the buffer. Further, when a received frame is self-addressed one, the frame is aborted on the basis of a signal from the abortion indicating part 96. When the received data is addressed to another node or multi-addressed, the parallel signal 105 is selected by the second field selector 95, to be relayed to the next node.

When a multicast information frame is applied to the control unit in a state that the buffer is busy, a signal 101 from the DMA 84 informs the received-data processor 83 that the buffer is busy, and the transmission controller 87 is actuated to form a multicast response frame. The multicast response frame is formed on the basis of a control signal 104 from the transmission controller 87. That is, the outputs of a destination address part 88, a source address part 89 and a loop command part 90 which are loaded with predetermined values, and the output of a delimiter generator 91 are selected by a first field selector 94, and the output of the selector 94 and the output of a frame check sequence (FCS) computing part 92 are selected by the second field selector, to form the multicast response frame.

In a case where a multicast information frame has been transmitted from the present control unit, the multicast information frame transmitting flag is recorded in the state controller 86. In a case where the multicast information frame is retransmitted from the present control unit, an information field signal 106 from the buffer is selected by the first field selector 94, together with the outputs of the parts 88, 89, 90 and 91, to form a retransmitted information frame. Further, a time necessary for the multicast information to be transmitted from the present control unit to return thereto, is monitored by a timer 85.

When a conventional communication control unit is additionally provided with the hardware for transmitting a BSY frame at a time the control unit fails in accepting a multicast information frame, and the hardware for checking the BSY frame which follows the multicast information frame, delivery confirmation of transmitted information can be made not only in individual communication but also in the embodiment of FIG. 4.

As has been explained in the foregoing, according to the present invention, the delivery confirmation of a multicast information frame can be made, and moreover the multicast information frame can be retransmitted when multi-address communication results in failure because of the busy state of a buffer. That is, the transmission of the multicast information frame can be surely controlled. Further, even when multi-address communication results in failure because of an error or fault in hardware, the delivery confirmation of a multicast information frame can be made, and thus reliable multi-address communication can be carried out.

We claim:

1. A method of multi-address communication in a network formed by connecting, in a ring, a plurality of nodes each coupled with a data processor, through a transmission line having a single transmission direction, wherein an information frame transmitted to said transmission line from one of said nodes is relayed successively by other nodes to return to the originating node, said method comprising the steps of:

transmitting from a first node of said plurality of nodes a multicast information frame to be delivered to other nodes of said plurality of nodes and subsequently, transmitting a multicast response frame for confirmation of delivery of said multicast information frame to said transmission line, said multicast response frame containing a source address and a destination address;

relaying from a node, which is in a busy state when said multicast information frame is received by said node, said multicast information frame and said multicast response frame transmitted thereto to a succeeding node unchanged;

checking a relationship between said source address or said destination address in said multicast response frame and an address stored in a node successful in receiving said multicast information frame, and changing said source address or said destination address in said multicast response frame when a predetermined relationship is ascertained in said checking step, or relaying said multicast response frame to a succeeding node without changing said source address or said destination address; and determining whether said multicast information frame is to be retransmitted by said first node by checking said source address or said destination address in said multicast response frame returned thereto.

2. A method according to claim 1, wherein each node of said plurality of nodes stores beforehand an address of said each node and an address of an adjacent preceding node, and at each node successful in receiving said multicast information frame, said source address in said multicast response frame subsequent to said multicast information frame is compared with said stored address of said adjacent preceding node, and when a coincidence is established between comparing said source address and said a stored address of said adjacent preceding node a multicast response frame having its source address replaced by said stored address of said each node is transmitted an adjacent succeeding node.

3. A method according to claim 2, wherein said each node successful in receiving said multicast information frame, compares said source address in said multicast response frame to said stored address of said adjacent preceding node and when a coincidence is not established between said source address and said stored address of said adjacent preceding node, code information indicative of an occurrence of an unsuccessful reception is placed in said multicast response frame.

4. A method according to claim 1, wherein said node of said plurality of nodes stores beforehand an address of said node and an address of an adjacent succeeding node, and said first node transmits said multicast response frame with an address of an adjacent succeeding node of said first node as a destination address, wherein each node successful in receiving said multicast information frame compares said destination address in said multicast response frame subsequent to said multicast information frame to said stored address of said node, and when a coincidence is established between said destination address and said stored address of said node a multicast response frame having said destination address replaced by said address of said adjacent succeeding node is transmitted to an adjacent succeeding node, and wherein said first node determines whether said multicast information frame is to be retransmitted depending on whether said destination address in said multicast response frame returned to said first node is in coincidence with a stored address of said first node.

5. A method according to claim 1, wherein when said first node receives a token frame circulating on said transmission line, said first node transmits said multicast information frame and said multicast response frame while holding said token frame, and thereafter releases said token frame.

* * * * *